June 20, 1961

T. P. COOLEY 2,988,924

SABRE SAW

Filed Dec. 3, 1957

INVENTOR.
THOMAS P. COOLEY

BY

Lindsey and Prutzman
ATTORNEYS

June 20, 1961  T. P. COOLEY  2,988,924
SABRE SAW

Filed Dec. 3, 1957

INVENTOR.
THOMAS P. COOLEY
BY
Lindsey and Prutzman
ATTORNEYS

June 20, 1961

T. P. COOLEY 2,988,924

SABRE SAW

Filed Dec. 3, 1957

INVENTOR.
THOMAS P. COOLEY
BY
Lindsey and Prutzman
ATTORNEYS

United States Patent Office 2,988,924
Patented June 20, 1961

2,988,924
SABRE SAW
Thomas P. Cooley, Simsbury, Conn., assignor to The Stanley Works, New Britain, Conn., a corporation of Connecticut
Filed Dec. 3, 1957, Ser. No. 700,489
6 Claims. (Cl. 74—50)

This invention relates to sabre saws and more particularly to a novel and improved portable sabre saw.

It is the purpose of this invention to provide a portable sabre saw having novel and improved means for reducing the vibration of the saw resulting from the reciprocation of the saw blade and elements carrying the saw blade.

It is another object of this invention to provide a portable sabre saw having novel and improved means for imparting simple harmonic motion to a blade carrying plunger which is balanced from the standpoint of net force and dynamic balance.

It is further an object of this invention to provide a sabre saw of the type described wherein the means for reducing vibration has relatively few parts which will not materially increase the overall weight of the saw so as not to adversely affect the portability of the saw and yet which are of rugged construction to provide a heavy duty saw capable of extended rough usage without failure or malfunction.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

Figure 1:
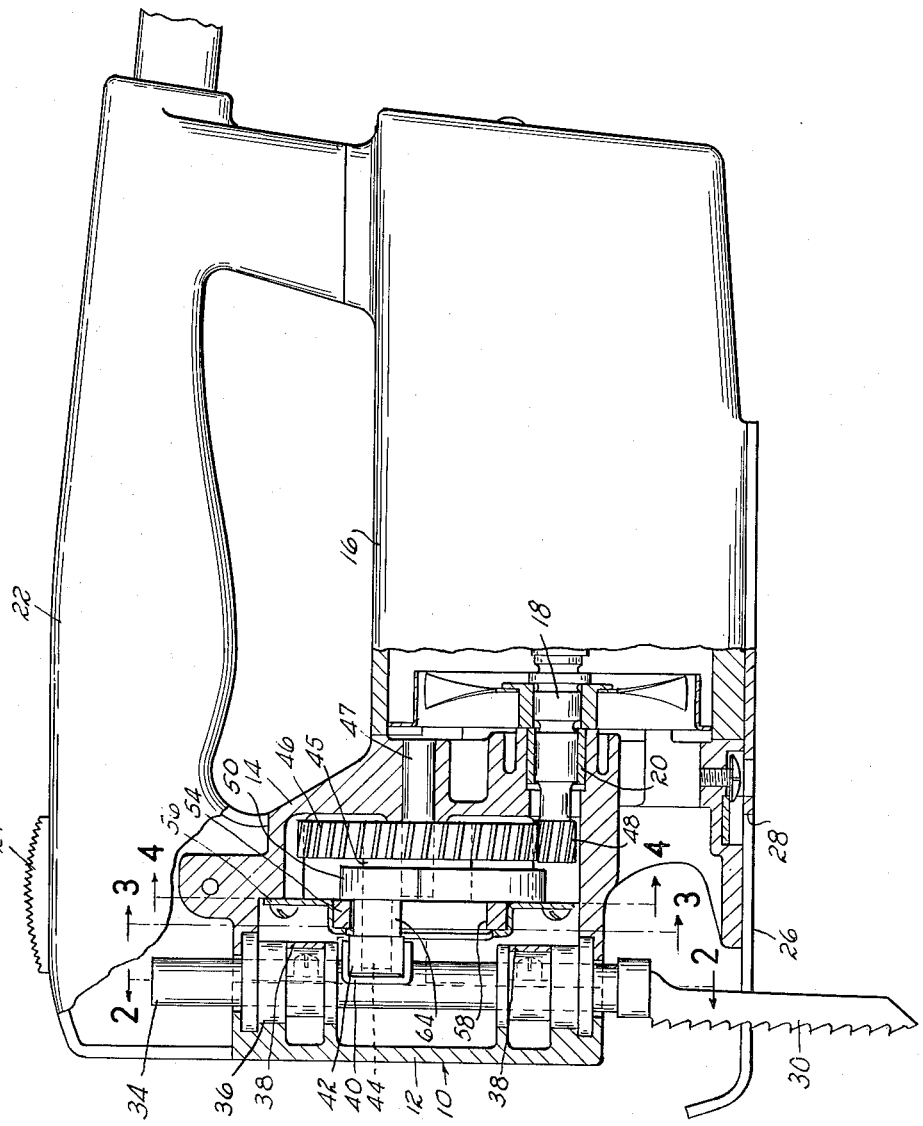
FIG. 1 is a side view partly in section of a sabre saw embodying the invention.

A sabre saw of a type with which this invention is concerned is shown in the drawings and comprises a split body 10 having a front section 12 and a rear section 14 on which is mounted a motor housing 16 inclosing an electric motor (not shown) having a shaft 18 journaled in a bearing 20 in the rear body section. A hollow handle 22 is mounted on the top of the body 10 and the motor housing 16 and carries an operating switch 24 for the saw. A base plate 26 is secured to the bottom of the body and motor housing and is provided with the usual slot 28 through which a blade 30 may extend. The blade 30 is carried by a plunger 34 slidably received in spaced-apart bushings 36 engaged in recesses in the front body section 12 and retained therein by straps 38 secured to the front body section. A crosshead 40 is mounted on the plunger and extends at right angles to the longitudinal axis of the plunger. The crosshead 40 is slidably engageable with ribs 41 cast integrally with the front body section to prevent rotation of the plunger about its longitudinal axis. A crosshead slider 42 is slidably engaged in the crosshead for reciprocation longitudinally thereof and is provided with a central aperture in which is rotatably received a crank pin 44 integral with and disposed eccentrically of a bushing 45 journaled on a stub shaft 47 mounted on the rear section of the body. A gear 46 is mounted coaxially on one end of the bushing 45 for rotation therewith and is drivingly engaged by a drive pinion 48 integral with the outer end of the motor shaft 18.

Figure 3:
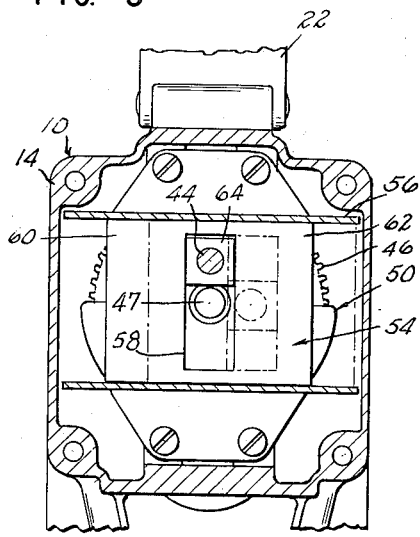
FIG. 3 is a fragmentary cross-sectional view substantially along the line 3—3 of FIG. 1.
Figure 4:
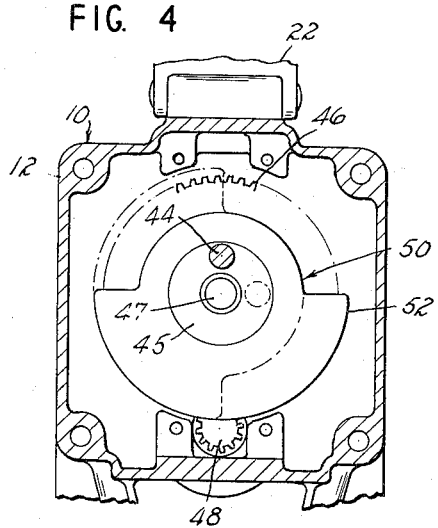
FIG. 4 is a fragmentary cross-sectional view substantially along the line 4—4 of FIG. 1.

In accordance with the invention, and as most clearly shown in FIG. 4, an eccentric rotatable counterweight 50 is mounted coaxially on a portion of the bushing 45 extending forwardly of the gear 46 for rotation with the bushing. The eccentrically disposed weighted portion 52 of the counterweight 50 is disposed on the opposite side of the axis of rotation of the counterweight from the crank pin 44 and is of sufficient mass relative to its eccentricity to counterbalance the plunger 34 during reciprocation of the plunger. Further, in accordance with the invention, and as most clearly shown in FIG. 3, a reciprocating or linear counterweight 54 is located between the rotating counterweight 50 and the crosshead 40. The reciprocable counterweight is slidably supported in a guide track 56 mounted on the rear section of the body to guide the reciprocation of the counterweight 54 along a path parallel to the plane of rotation of the rotatable counterweight 50 and at right angles to the path of reciprocation of the plunger 34. The reciprocating counterweight is provided with an elongated vertical slot 58 extending at right angles to its path of movement and dividing the counterweight 54 into two portions 60 and 62 of equal mass. A slider 64 is slidably received in the slot 58 and is provided with a central aperture in which the crank pin 44 is rotatably received.

Figure 2:
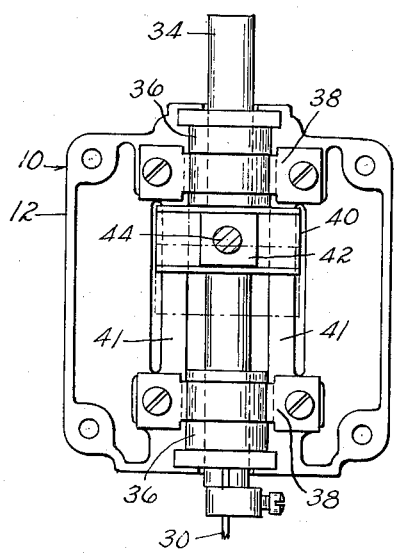
FIG. 2 is a fragmentary cross-sectional view substantially along the line 2—2 of FIG. 1.

In the operation of a sabre saw embodying the invention, rotation of the driving pinion 48 will, through rotation of the gear 46, the crank pin 44, slider 42 and crosshead 40, effect reciprocation of the blade carrying plunger 44. The disposition of the eccentric rotatable counterweight 52 relative to the crank pin 44 and axis of rotation of the counterweight will, as shown in FIGS. 2 and 4, result in the vertical component of force of the rotatable counterweight being directed in opposite vertical directions relative to the movement of the plunger. Further, as will be apparent from the consideration of FIGS. 3 and 4, the horizontal component of force of the eccentric counterweight 50 will be directed oppositely the directions of movement of the reciprocating counterweight 54 as illustrated by the dotted line positions as shown in FIGS. 3 and 4. Thus the rotatable counterweight will counterbalance the vertical unbalance forces of the plunger while the reciprocating counterweight will counterbalance the horizontal unbalance of the rotating counterweight.

Figure 5:
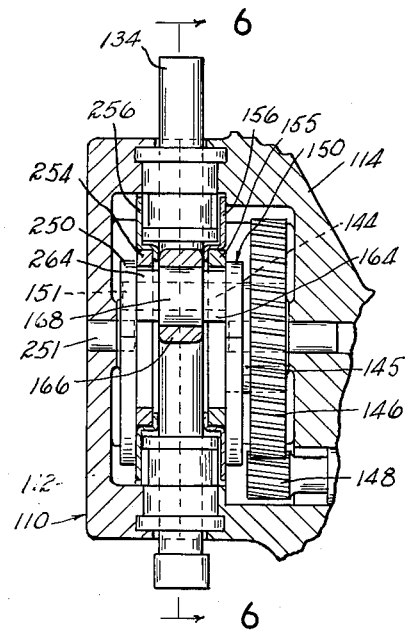
FIG. 5 is a fragmentary longitudinal cross-sectional view of a sabre saw showing a modified form of the invention.
Figure 6:
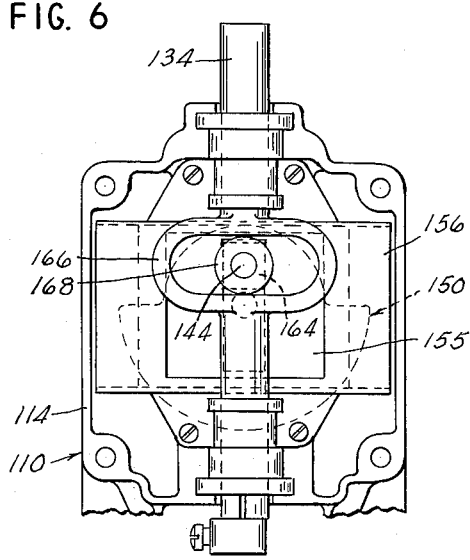
FIG. 6 is a fragmentary cross-sectional view substantially along the line 6—6 of FIG. 5.

A modified form of the invention is shown in FIGS. 5 and 6 which will provide a dynamically as well as a statically balanced system. This embodiment is generally similar to that of FIGS. 1–4; however, provisions have been made to eliminate the dynamic unbalance in the previously described embodiment occasioned by the spacing of the counterweights and plunger longitudinally of the crank 144. Specifically the embodiment of FIGS. 5 and 6 comprises a split body 110 having a front section 112 and a rear section 114 with a drive pinion 148 and interengaged driving gear 146 mounted coaxially on one end of a bushing 145 journaled on the rear body section. A rotatable eccentric counterweight 150 similar to the previously described counterweight 50 is mounted on the other end of the bushing 145 coaxially of the gear 146 for rotation therewith about an axis extending at right angles to a plunger 134 reciprocably mounted on the body 110. The plunger has a crosshead or yoke 166 in which is slidably received a drive roller 168.

The bushing 145 has an elongated integral crank pin 144 extending therefrom and rotatably received intermediate its ends in an aperture in the roller 168. The outer end 151 of the crank pin is engaged in an eccentrically disposed aperture in a second rotatable eccentric counterweight 250 disposed on the opposite side of the plunger from the counterweight 150 and spaced from the plunger at a distance equal to the spacing of the counterweight 150 from the plunger. The counterweight 250 is rotatably mounted on the front body section 112 coaxially of the gear 146 by a stub shaft 251 and has an eccentric mass equal to that of the counterweight 150. The total eccentric mass of the rotatable counterweights is sufficient to counterbalance the mass of the plunger 134.

A pair of linear counterweights 155, 254 are disposed on opposite sides of the plunger 134 intermediate the rotatable counterweights and are slidably carried in guide tracks 156, 256 mounted on the rear and front body sections, respectively, and extending at right angles to the path of reciprocation of the plunger and in planes parallel to the planes of rotation of the rotatable counterweights. Each linear counterweight is provided with a slot extending longitudinally of the path of movement of the plunger or laterally of the counterweight and dividing the counterweight into two sections of equal mass. A pair of sliders 164, 264 are slidably engaged in the slots in the linear counterweights and have centeral apertures rotatably receiving the crank pin 144 to provide reciprocation of the linear counterweights in response to rotation of the gear 146. The linear counterweights are equi-distant from the plunger and are of equal mass, with the total mass of the counterweights being sufficient to counterbalance the horizontal component of unbalance of the rotating counterweights.

The operation of the embodiment of FIGS. 5 and 6 is identical with that of the embodiment of FIGS. 1 to 4 previously described. However, the provision of a pair of rotating counterweights of equal eccentric mass and a pair of linear counterweights of equal mass with the counterweights of each pair disposed on opposite sides of the plunger and equi-distant from the plunger provides a dynamically as well as a statically balanced system.

It can thus be seen that there has been provided a portable sabre saw having a mechanism for translating the rotary motion of a motor to a simple harmonic motion of a blade carrying plunger embodying novel and improved means to counterbalance the plunger from a standpoint of net force balance or to counterbalance the plunger from a standpoint of dynamic as well as net force balance. The counterbalance system utilized relatively few parts and thus does not materially increase the overall weight of the saw so as to effect its portability and is of obviously rugged construction to provide a heavy duty saw having an extended trouble-free service life.

I claim:

1. In a sabre saw, a reciprocably mounted member adapted to carry a saw blade, a rotatable eccentric counterweight mounted for rotation about an axis extending at right angles to the path of reciprocation of said member, a reciprocable counterweight mounted for reciprocation in a plane extending parallel to the plane of rotation of the rotatable counterweight, and at right angles to the path of reciprocation of said member and means drivingly connecting said member and rotatable counterweight for simultaneous movement thereof in opposite directions longitudinally of the path of movement of said member and drivingly connecting the counterweights for simultaneous movement in opposite directions longitudinally of the path of movement of the reciprocating counterweight.

2. In a sabre saw, a body, a plunger reciprocably supported on the body and adapted to carry a saw blade, an eccentric counterweight rotatably mounted on the body for rotation about an axis extending at right angles to the path of reciprocation of the plunger and having sufficient mass and eccentricity to counterbalance the plunger in response to simultaneous movement of the plunger and counterweight, a linear counterweight slidably supported on the body for reciprocation at right angles to the path of movement of the plunger and the axis of the eccentric counterweight and of sufficient mass to counterbalance the component of dynamic unbalance of the eccentric counterweight directed along the path of movement of the linear counterweight, and a crank member mounted for rotation with the eccentric counterweight disposed on the side of the axis of the eccentric counterweight oppositely the eccentric mass thereof and drivingly connecting the plunger and counterweight for simultaneous movement.

3. In a sabre saw, a body, an elongated plunger reciprocably mounted on the body and adapted to carry a saw blade, a crosshead on the plunger, a drive member slidably engaged with the crosshead, an eccentric counterweight rotatably supported on the body for rotation about an axis extending at right angles to the path of reciprocation of the plunger, a linear counterweight, a guide track mounted on the body and slidably supporting the linear counterweight for reciprocation at right angles to the axis of the eccentric counterweight and in a plane parallel to the plane of rotation of the eccentric counterweight, the linear counterweight having a slot extending laterally thereof, a slider engaged in the slot, a crank pin mounted for rotation with the eccentric counterweight and rotatably received in the drive member and slider, and means to rotate the eccentric counterweight.

4. In a sabre saw, a reciprocable supporting member adapted to carry a saw blade, a pair of eccentric counterweights disposed on opposite sides of the supporting member and coaxially mounted for rotation about an axis extending at right angles to the path of movement of the supporting member, a pair of linear counterweights disposed on opposite sides of the supporting member and slidably supported for reciprocation at right angles to the axis of the eccentric counterweights and in planes parallel to the planes of rotation of the eccentric counterweights, and means drivingly connecting the supporting member and pair of eccentric counterweights for simultaneous movement of the counterweights and supporting member in opposite directions longitudinally of the path of movement of the supporting member and also drivingly connecting the pair of eccentric counterweights and pair of linear counterweights for simultaneous movement in opposite directions longitudinally of the path of movement of the linear counterweights.

5. In a sabre saw, a reciprocably mounted plunger adapted to carry a saw blade, a pair of eccentric counterweights disposed equi-distance from and on opposite sides of the plunger and coaxially mounted for rotation about an axis extending at right angles to the path of movement of the plunger, a pair of linear counterweights disposed equi-distant from and on opposite sides of the plunger and mounted for reciprocation at right angles to the path of movement of the plunger and on planes parallel to the planes of rotation of the eccentric counterweights, and a crank member mounted eccentrically of the eccentric counterweights for rotation therewith and drivingly connecting the eccentric counterweights, linear counterweights and plunger for simultaneous movement.

6. In a sabre saw, a body, a plunger slidably supported on the body for reciprocation relative thereto and having a yoke intermediate its ends, a roller slidably engaged in the yoke, a pair of eccentric counterweights disposed on opposite sides of the plunger and rotatably mounted on the body for rotation about a common axis extending at right angles to the path of movement of the plunger, a pair of linear counterweights disposed on opposite sides of the plunger and intermediate the eccentric counterweights and plunger, a pair of guide tracks mounted on the body and slidably supporting the linear counterweights for reciprocation at right angles to the path of movement of the plunger and in planes parallel to the planes of rotation of the eccentric counterweights, each linear counterweight having a slot extending laterally thereof, a slider in each slot, and a crank pin extending between and fixed eccentrically relative to the eccentric counterweights for movement therewith and rotatably received in the roller and sliders.

References Cited in the file of this patent

UNITED STATES PATENTS

| | | | |
|---|---|---|---|
| 672,320 | Ford | Apr. 16, | 1901 |
| 2,345,383 | Curtis | Mar. 28, | 1944 |
| 2,501,631 | Oschwald | Mar. 21, | 1950 |
| 2,704,941 | Holford | Mar. 29, | 1955 |
| 2,764,188 | Hoffman | Sept. 25, | 1956 |
| 2,841,993 | Kaufmann | July 8, | 1958 |